US007358895B2

(12) United States Patent
Ziedan et al.

(10) Patent No.: US 7,358,895 B2
(45) Date of Patent: Apr. 15, 2008

(54) SYSTEM AND METHOD FOR ACQUIRING WEAK SIGNALS IN A GLOBAL POSITIONING SATELLITE SYSTEM

(75) Inventors: Nesreen I. Ziedan, Oxford, OH (US); James L. Garrison, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 11/212,125

(22) Filed: Aug. 25, 2005

(65) Prior Publication Data
US 2007/0046534 A1   Mar. 1, 2007

Related U.S. Application Data

(60) Provisional application No. 60/604,333, filed on Aug. 24, 2004.

(51) Int. Cl.
*G01S 1/00* (2006.01)
*H04B 7/185* (2006.01)
(52) U.S. Cl. .................................. 342/357.12
(58) Field of Classification Search ................ 375/148; 342/357.12, 357.6–357.15
See application file for complete search history.

(56) References Cited

U.S. PATENT DOCUMENTS

2007/0005217 A1* 1/2007 Yang et al. ............ 342/357.12

* cited by examiner

*Primary Examiner*—Thomas H. Tarcza
*Assistant Examiner*—Nga X Nguyen
(74) *Attorney, Agent, or Firm*—Maginot, Moore & Beck (57) ABSTRACT

A method of acquiring a weak signal includes selecting a first predetection integration time (PIT) interval for processing a digital intermediate frequency (IF) signal, selecting a number of data bit edges within the PIT, computing a plurality of coherent integrations for each data bit edge, selecting a coherent integration, which corresponds to a most likely data combination for each data bit edge, from the plurality of coherent integrations, updating an incoherent integration total for each data bit edge with the coherent integration corresponding to the selected most likely data bit combination for each data bit edge, comparing the incoherent integration total for each data bit edge with a threshold after a predetermined number of steps of the coherent integration computations and incoherent integration total updates, and identifying a code delay from the incoherent integration. The method may also include determining a code delay from an estimated Doppler shift corresponding to the identified code delay. In this method, the coherent integrations are computed using a circular correlation technique that is performed in a manner so the coherent integrations are not independent from one another in successive steps. Thus, computational efficiencies may be gained from subsequent uses of coherent integrations computed during previous steps. The circular correlation is preferably performed over intervals corresponding to the separation between data bit edges.

16 Claims, 6 Drawing Sheets

SYSTEM AND METHOD FOR ACQUIRING WEAK SIGNALS IN A GLOBAL POSITIONING SATELLITE SYSTEM

This application claims the benefit of U.S. Provisional Patent Application Ser. No. 60/604,333 having a filing date of Aug. 24, 2004 that is incorporated herein by reference; and U.S. patent application Ser. No. 11/212,021 having a filing date of Aug. 24, 2005 and entitled System and Method for Acquiring Weak Signals in a Global Positioning Satellite System (now abandoned).

FIELD OF THE INVENTION

This disclosure relates to global positioning satellite receivers, and more particularly, to global positioning satellite receivers that detect weak strength signals from the positioning satellites.

BACKGROUND OF THE INVENTION

The Global Positioning System (GPS) is a satellite-based location system. In the GPS, several satellites orbiting the earth provide signal codes that are detected by receivers. The receivers use the codes to lock onto the satellite signal. The receiver or user then measures the time of arrival of the satellite signal against an internal clock, which indicates a delay from the satellite. Such delay is determined for at least four different satellites. Those delays translate to distances. Because the distances to each of four satellites are known, and because the position of the satellites are known, the X, Y, and Z coordinates of the user may be calculated, as well as the user's clock error. This method is known as pseudo-ranging, and systems other than GPS use similar technology.

The delay between transmission of a satellite and reception by a receiver is obtained by causing the receiver to latch onto a repetitive code of a particular satellite. To this end, the receiver generates the code of each satellite in a repetitive pattern and then, for a particular satellite, tries to line up the internally generated code with the received code from the satellite. To "line up" the internally generated code, the internally generated code sequence must be delayed by some amount. This delay provides the time measurement from the internal clock, $Code_{sat1}(t)=Code_{rec}(t+\delta_1)$, where $\delta_1$ is a delay value. By aligning internal codes of other satellites with corresponding internal codes, other delay values may be obtained. Thus, for three other satellites, delay values $\delta_2$, $\delta_3$, and $\delta_4$ may be generated. Then, by obtaining the position information for those satellites $(x_j, y_j, z_j)$ for $j=\{1, 2, 3, 4\}$, a system of equations may be set up to determine the location of the receiving device.

The system of equations is derived from the equation for the distance between a satellite and the receiver in terms of delay, which may be expressed as: Distance=$\delta_j*C$ (speed of light). However, the measured delay does not provide an absolute delay value because the clock in the receiver is not necessarily synchronized to the satellites, which are synchronized together. So the actual distance between a satellite n and the receiver is the measured delay $\delta_j$, plus a receiver clock offset $T_{off}$, times the speed of light. Thus, the following system of equations can be set up:

$$(\delta_1+T_{off})*C=[(x_1-x_r)^2+(y_1-y_r)^2+(z_1-z_r)^2]^{1/2}$$

$$(\delta_2+T_{off})*C=[(x_2-x_r)^2+(y_2-y_r)^2+(z_2-z_r)^2]^{1/2}$$

$$(\delta_3+T_{off})*C=[(x_3-x_r)^2+(y_3-y_r)^2+(z_3-z_r)^2]^{1/2}$$

$$(\delta_4+T_{off})*C=[(x_4-x_r)^2+(y_4-y_r)^2+(z_4-z_r)^2]^{1/2}$$

The above four equations amount to four equations with four unknown variables, which may then be solved for the receiver position $x_r$, $y_r$, $z_r$, as well as the offset of the receiver clock $T_{off}$. Because the speed of light is 286,000 miles per second, even a small discrepancy in a delay measurement $\delta_j$ that is used to compute the distance from the distance equation already noted, can result in significant inaccuracy.

The processing capability of wireless devices is increasing and the incorporation of GPS positioning applications in such devices is desirable. Such applications may work well in these devices in environments where a strong signal may be received from a satellite. These devices, however, are typically used in urban environments. In an urban environment, the user may travel under a bridge, through a tunnel, or through what is referred to in the literature as an "urban canyon," in which buildings block the signals or reflect them. Consequently, the wireless device may need to acquire and track weak signals from the positioning satellites.

Accurate alignment of the internal and external codes to get a precise delay number in a weak signal environment may be difficult. To facilitate accurate alignment, the acquisition code sequence, known in the art at the C/A code, is 1023 bits and repeated periodically every 1 millisecond. By superimposing the internal code over the received code for multiple instances of the code, a correlation technique may be used to filter out noise present in the signal. As the number of 1 millisecond periods used for correlation increases, the ability of the receiver to acquire weaker signals increases.

The practical number of subsequent sequences of the C/A code that may be used is hindered, however, by the fact that the C/A code is in fact superimposed over another signal, referred to as the data signal, which has a pulse width of 20 milliseconds. The data signal contains the time and location information for the satellite, among other things. Before the signal is acquired, the data signal is unknown to the receiver, and appears as a pseudorandom signal. Because the receiver does not know the data signal, the receiver does not know the effects of the data signal on the C/A sequences. Changes in the data signal from a +1 to a –1 value completely change the appearance of the C/A sequences. Moreover, although there are 20 repetitions of the C/A sequence for every data signal value, the receiver does not have a priori knowledge of when the transitions of the data signal occur. Accordingly, the imposition of the data signal makes the use of multiple C/A sequences to achieve acquisition of the C/A code for weak GPS signals difficult.

One way of improving the sensitivity to weak signals of a GPS receiver is to increase the predetection integration time (PIT), which reduces the noise bandwidth. The improvement available through this technique is limited because the location of the data bits and bit edges in the signal is unknown. For a GPS C/A code, the upper bound on the PIT is one code length (1 ms), if the data bits and the bit edge positions are unknown. The upper bound is one data length (20 ms), if only the data bits are unknown. Increasing the PIT, however, requires an increased number of Doppler bins, a signal processing structure used to estimate the Doppler shift in a signal. The increase in the number of these structures increases the processing and memory requirements for the coherent integrations.

Conventional weak signal acquisition systems implemented in hardware search satellites at each possible code delay and Doppler shift in a sequential manner. As a result, the processing time and memory requirements increase as the size of the search space increases. One approach to reducing the computational demands for coherent integrations is to use circular correlation techniques implemented in software. Circular correlation uses Fast Fourier Transform (FFT) methods to calculate the coherent integration at all possible code delays for each possible Doppler shift. Some systems that use other approaches than circular correlation are able to eliminate the use of Doppler bins, but they suffer from low sensitivity. Other systems use circular correlation with increased PIT, but they do not address unknown bit edge positions and data bits.

Another approach to reducing the demand for computational resources is to use a Double Block Zero Padding (DBZP) approach. This approach calculates correlations at all possible code delays and Doppler shifts in the same processing steps. The maximum integration length that can be used with DBZP is limited, however. The limitation arises from the use of only one replica code that is not compensated by the effect of the Doppler shift on the code duration.

These known techniques for acquiring the C/A code for weak signals require long coherent and incoherent integrations. These acquisition techniques also require more processing capability or memory than is typically available in many wireless devices. In order to improve the ability of wireless devices to incorporate GPS applications, weak signal acquisition methods are needed that do not require more computational resources than those available in wireless devices.

The discussion above focuses on the detection and acquisition of weak signals in the presence of background noise. That is, the data signal has been attenuated to a level that makes its detection difficult even when no interfering signal is present. A different problem arises when the GPS receiver attempts to detect and acquire a signal in the presence of strong interfering signals. As noted above, the GPS signal includes a C/A code for identification. Different C/A codes have non-zero cross-correlation. The cross-correlation between the local replica code and the code of a received interfering signal causes the interfering signal to appear with a reduced power from its original received power. This causes the interfering signal to appear at many code delays, which affects the processing for detecting and acquiring a weak GPS signal in the presence of a strong interfering signal. What is needed is a method for detecting a weak GPS signal in the presence of strong interfering signals.

SUMMARY OF THE INVENTION

The present overcomes the shortcomings of the prior art by updating an incoherent integration total with selected coherent integrations for data bit edges within a predetection integration time (PIT) interval that is a multiple of the data signal bit time length. This method enables the acquisition method to begin with a short PTI and then increase the PIT without requiring a corresponding increase in computational resources.

One method of acquiring a weak signal includes selecting a first predetection integration time (PIT) interval for processing a digital intermediate frequency (IF) signal, selecting a number of data bit edges within the PIT, computing a plurality of coherent integrations for each data bit edge, selecting a coherent integration, which corresponds to a most likely data combination for each data bit edge, from the plurality of coherent integrations, updating an incoherent integration total for each data bit edge with the coherent integration corresponding to the selected most likely data bit combination for each data bit edge, comparing the incoherent integration total for each data bit edge with a threshold after a predetermined number of steps of the coherent integration computations and incoherent integration total updates, and identifying a code delay from the incoherent integration. The method may also include determining a code delay from an estimated Doppler shift corresponding to the identified code delay. In this method, the coherent integrations are computed using a circular correlation technique that is performed in a manner so the coherent integrations are not independent from one another in successive steps. Thus, computational efficiencies may be gained from subsequent uses of coherent integrations computed during previous steps. The circular correlation is preferably performed over intervals corresponding to the separation between data bit edges.

The method may also include the elimination of Doppler bins after the incoherent integration total is updated so the PIT may be increased to improve receiver sensitivity to weak signals without a corresponding increase in the computational load for the process. Doppler bins are eliminated after a predetermined number of steps of incoherent integration total updates. The Doppler bins that are preserved are the ones for each data edge that generate higher power than the eliminated ones.

In each step of an acquisition, the most likely combination of data bits in the coherent integration interval is estimated. These bits are then used to remove the effect of the data signs before calculating the total coherent integration at that step. This process is applied in parallel for each of the possible edge positions. To determine the most likely data bit combination, the process follows different approaches throughout the steps. This increases the sensitivity of the receiver and reduces the degradation in the probability of detection arising from a wrong combination. The details of this selection are provided in more detail below.

The inventive method may also include increasing the PIT in response to the number of Doppler bins being less a predetermined maximum. That is, once the Doppler bin elimination method has reduced the number of Doppler bins below the maximum, the PIT may be increased without a corresponding increase in the need for computational resources. The PIT is preferably increased by an integral number of data bit lengths. Also, the number of data bit edges for the PIT is selected to be equal to or greater than 4 and less than 20.

The circular correlation using an interval that corresponds to the separation between data bit edges provides computational efficiencies in the computation of coherent integrations. The elimination of Doppler bins further reduces the need for additional computational resources as the PIT increases to improve receiver sensitivity. Consequently, a receiver implementing the method and its variants outlined above conserves computational resources sufficiently to render its use in wireless devices more useful.

In another embodiment of the present invention, a modified double block zero padding method is used to perform the correlation for the long coherent and incoherent integrations. In conventional double block zero padding (DBZP), only one replica code is used locally to calculate the correlation at all possible Doppler shifts and code delays. The replica code is not compensated for the Doppler effect on the code duration. This results in two problems. One problem is that the fraction of a code chip between subsequent samples is not the same in the received code as in the replica code. The second problem is that the received code would have produced fewer chips as compared to the local code. This causes the relative delay between the received and replica codes to change and subsequent incoherent integration will be added at the wrong delay. Consequently, the maximum integration length is limited in systems using conventional DBZP and the minimum carrier to noise ration (S/N$_0$) that can be acquired is limited.

The modified DBZP process implemented in an alternative embodiment of the present invention avoids these limitations. To perform the coherent integrations, the fuller Doppler range is divided into a small number of narrower ranges. The possible Doppler shifts located in the middle of each range are used to generate replica code versions that are compensated in length by the Doppler effect. This remedies the first problem with conventional DBZP systems. Assuming that the received and the local Doppler shifts are close to each other, the difference between the possible Doppler shift in the middle of each Doppler range and each of the other possible Doppler shifts within that range is used to estimate the change in the relative code delay between the received code and the replica codes. The estimated change in the relative code delay is then used to shift the coherent integration result before incorporating it into the total accumulation. Because the C/A code is periodic, the shifting is done circularly, which mitigates the second problem with conventional DBZP systems.

In another embodiment of the present invention, the method includes processing for detecting a weak GPS signal in the presence of strongly interfering signals. One method is used to detect a weak GPS signal in the presence of a strongly interfering signal that is no more than 15 dB higher than the power of the correct signal. This method operates as either one of the two acquisition methods described herein that use a circular correlation or a modified double block zero padding method for signal acquisition except the total number of integrations L and the acquisition threshold γ are designed with reference to the noise and interfering signal using numerical methods and taking into consideration the correct probability density function (PDF).

The second method is used for strongly interfering signals having a power that is at least 15 dB greater than the power of the correct signal. In this method the threshold is designed with reference to the noise only. This method is comprised of identifying all Doppler bins having a cell that exceeds a threshold, discarding Doppler bins having more than one code delay that exceeds the threshold, and identifying a detected signal in response to a Doppler bin having only one code delay that is greater than the threshold.

DETAILED DESCRIPTION

Figure 1:
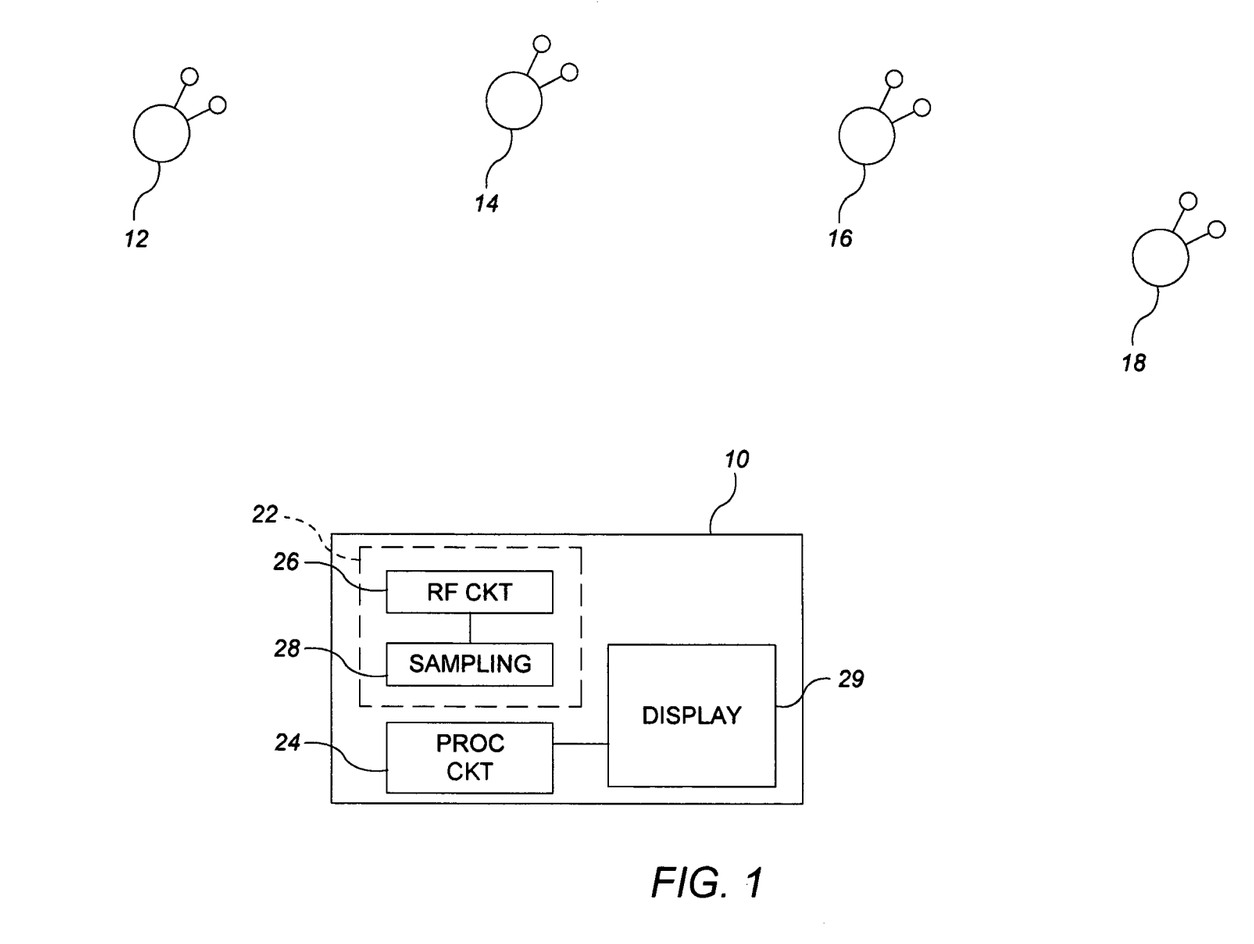
FIG. 1 shows a block diagram of a GPS receiver and four GPS satellites according to an exemplary embodiment of the present invention.

FIG. 1 shows a block diagram of an apparatus 10 for receiving and processing GPS signals, in an environment in which the apparatus 10 receives RF GPS signals from four satellites 12, 14, 16 and 18. The receiver 10 includes an antenna 20, an input circuit 22 and a processing circuit 24.

The input circuit 22 is operably connected to receive RF GPS signals detected by the antenna, and to convert the signals into digital IF signals. As is known in the art, GPS signals are transmitted on the known L1 carrier frequency 1575.42 MHz. In the embodiment described herein, the input circuit 22 includes an RF processing circuit 26 and a sampling unit 28. The RF processing unit 26 includes filtering, amplification and frequency conversion equipment known in the art, and is capable of generating an analog IF signal from the 1575.42 signal. The sampling unit 28 is a device operable to sample, and preferably downsample, the analog IF signal in order to generate the digital code signal.

As is known in the art the code signal consists of a transmitted code (from one of the satellites 12, 14, 16 and 18) plus a noise element. The received signal may thus be represented as:

$$r_q = A d_q c_q \cos(\Theta + f_d t_q) + n_q,$$

where $r_q$ is a received value at a sample index q, A is the amplitude of the transmitted signal, $d_q$ is the transmitted navigational data value at a sample q, $c_q$ is the transmitted C/A code value at the sample q, $\Theta$ is the phase, $f_d$ is the Doppler shift, and $n_q$ is the noise added at the sample q. The navigational data $d_q$ includes the position information provided by the satellite, each data bit having a duty cycle of 20 milliseconds, and each bit having a value of either −1 and +1.

Figure 2:
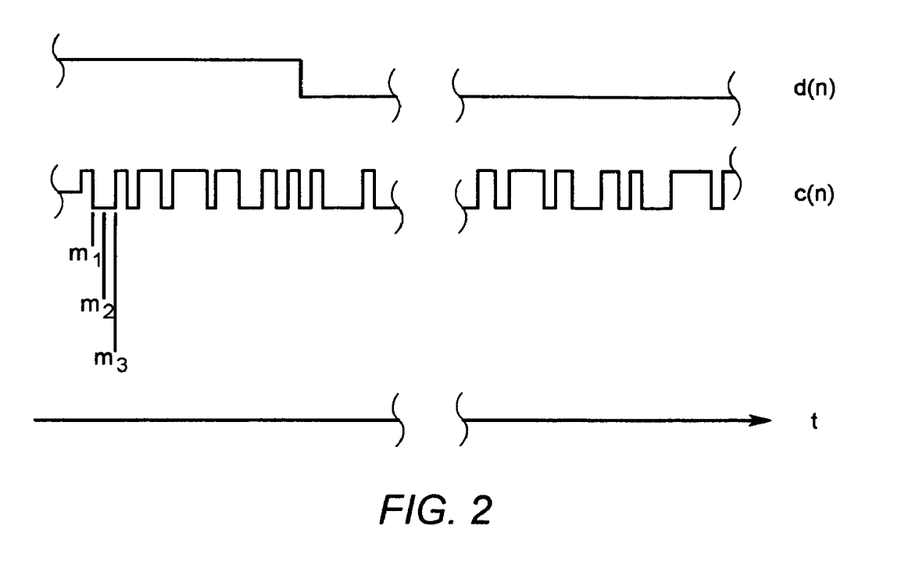
FIG. 2 shows a timing diagram of constituent elements of the GPS baseband signal.

FIG. 2 shows a timing diagram of the components of an exemplary transmitted signal including the data signal d(n) and the C/A code c(m). The rate of n is 50 Hz, while the rate of m is 1,023,000 chips/sec. As discussed above, there are approximately 1023 code bits in the C/A code sequence for each satellite, and the C/A code sequence is repeated twenty times for each data signal bit d(n). FIG. 2 furthermore shows exemplary sample times q which are used to develop the received signal $r_q$. Thus, d(n), as used herein, represents the data signal value for a data signal bit indexed n, while $d_q$ represents the value of the data signal d(n) for each sample q that is taken. Similarly, $c_q$ represents the value of the data signal c(m) for each sample q that is taken.

In general, the processing circuit 24 is a digital processing circuit that is operable to acquire GPS signals using the digital code signal $r_q$. Acquiring a GPS signal means that the processing circuit 24 is able to identify a particular C/A code sequence unique to the satellite that transmitted the signal, and successfully predict the starting time of the C/A code sequence. The processing circuit 24 is further operable to track the acquired code using known methods, which allows the processing circuit to obtain the navigational data signal d(n) over time and to further ascertain the alignment of the internal code with the received code.

The processing circuit 24 is also operable to generate a delay value representative of a delay between an internal code replica c'(m) and the code c(m) of the received signal $r_q$. This delay is the delay $\delta_n$, which was described above. To this end, in accordance with aspects of some embodiments of the invention, the processing circuit 24 is operable to perform long coherent and incoherent integrations using circular correlation to acquire the C/A code c(m) and hence recovery of the navigation data bits d(n). This method also helps determine a Doppler frequency shift caused be relative motion between one of the satellites and the receiver 10. The Doppler frequency is required because the frequency of C/A code bits as well as the frequency of the data bits shift from their expected frequencies. The knowledge of the Doppler frequency shift allows for accurate alignment of the internal C/A code replica with the received C/A code signal. The processing circuit 24 and the other circuits of the receiver are used to acquire $\delta_j$ values for each of the satellites 12, 14, 16, and 18.

The processing circuit 24 is further operable to receive the navigation data $d_j(n)$ for each satellite j when the C/A code of the satellite is acquired and tracked, as is known in the art. The navigation data $d_j(n)$ provides the $x_j$, $y_j$, and $z_j$ position information for each satellite j. Once the position information and the delay information for four satellites 12, 14, 16 and 18 are known, the position of the receiver may be solved using the system of equations discussed above. To accomplish the foregoing, the processing circuit 24 may suitably be one or more microprocessors, co-processors, digital signal processors, controllers, discrete or custom processing devices or combinations thereof.

Figure 3:
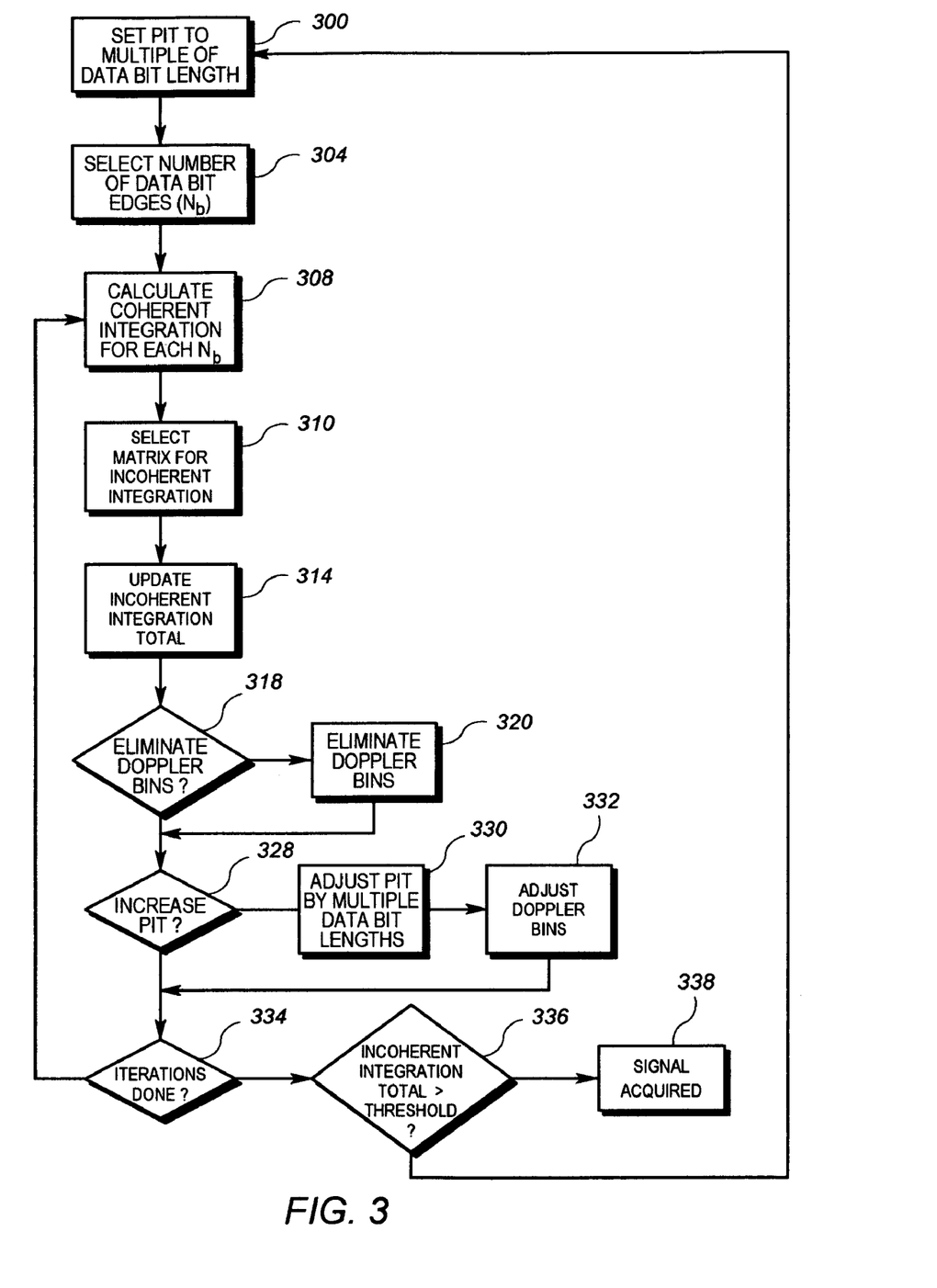
FIG. 3 shows a flow diagram of an exemplary set of operations for the processing circuit of the GPS receiver in FIG. 1.

An exemplary process performed in accordance with the principles of the present invention that may be implemented by the processing circuit 24 is shown in FIG. 3. The process commences by selecting a predetection integration time interval (PIT) that is a integral multiple of the time length of a data bit in the navigational data signal (block 300). For reasons discussed in more detail below regarding Doppler bin elimination, the PIT is preferably set to one multiple of the data bit length for the first step, namely, 20 ms for a GPS signal. Thereafter, when PIT is increased, it is increased by an integral multiple of the data bit length. For each possible Doppler shift in the PIT, a Doppler compensated $I_L$ local signal and a $Q_L$ local signal are generated at the sampling times. Thus, the relative delay between the received and the local codes stay approximately the same during acquisition. Because the maximum acquisition time is only a few seconds, the start of the PIT, at worst case, is off by only a few samples from the bit edge transition and the number of those samples may be found from $\delta_T$.

The number of data bit edges for the PIT is then selected (block 304). The data bit edges are positions within the PIT for the start of a navigational data bit. They are aligned on 1 ms C/A code period boundaries and, at the 50 Hz rate for the navigational data signal, there are 20 possible bit edge positions within one data bit length. The total number of data edge positions selected for a PIT is denoted by the symbol $N_b$. To estimate the bit edge and align the coherent integration intervals with the bit edges, $N_b$ arrays of incoherent integrations are maintained in parallel. Each one consists of the results from $N_T N_{fd}$ delay-Doppler cells corresponding to each possible code delay and Doppler shift. Because only $N_b$ possible edge positions are considered, the number of samples by which the PIT may be off, as noted above, the negative effect of this discrepancy is negligible compared to the loss due to the separation between the actual bit edge position and the nearest of the $N_b$ possible edges. To reduce processing and memory requirements, $N_b$ is chosen to be less than 20 and the chosen edges are evenly spaced over the data bit intervals. The preferred range for the number $\geq 4$ and <20.

For each step, $N_b$ coherent integrations are computed with each one starting at a possible bit edge position (block 308, FIG. 3). They are performed over an interval using a Fast Fourier transform and the interval is $T_{FFT}$ ms in length, where $T_{FFT}=T_{dms}/N_h$, the separation between possible bit edges. The complex correlation between the received signal and the local one over each $T_{dms}$ ms within $T_{lk}$ ms at a given bit edge b and at a step/of the acquisition may be expressed as:

$$s_{b,n_t}(\tau_u, f_{d_v})|_l =$$

$$\sum_{h=1}^{N_b}\sum_{n=1}^{N_h} r(t_{\delta_{h,n_t}+n-1})[I_L(t_{\delta_{h,n_t}+n-1}, \tau_u, f_{d_v}) + jQ_L(t_{\delta_{h,n_t}+n-1}, \tau_u, f_{d_v})]_l$$

where $b=1, \ldots, N_b$ is a possible bit edge index, $n_t=1, \ldots, N_{tk}$ is the index of each $T_{dms}$ within one $T_{lk}$, h is the index of each $T_{FFT}$ with one $T_{dms}$, n is the sample index within each $T_{FFT}$ ms, $N_h$ is the number of samples in the $T_{FFT}$, $\delta_{h,n_t}$ is the index of the first sample in the $h^{th}$ $T_{FFT}$ ms of the current $T_{dms}$ ms. Defining the inner summation series above by $G_{h,b,n_t}$ yields:

$$s_{b,n_t}(\tau_u,f_{d_v})|_l = \sum_{h=1}^{N_b} G_{h,b,n_t}(\tau_u,f_{d_v})|_l$$

where the G term represents the coherent integration over $T_{FFT}$ ms. Each $T_{FFT}$ ms can be part of up to $N_b$ different $S_{b,n_t}$ integrations. Therefore, each coherent integration over each $T_{FFT}$ ms is calculated only once and the used in all the G values that represent the coherent integration over that same $T_{FFT}$ ms. The coherent integration for each $T_{dms}$ ms at each possible bit edge may be found as follows. For the first $T_{dms}$ in the first step, $s_{1,1|1}$ is computed directly from the equation above. For $b=2, \ldots, N_b$, $n_t=1, \ldots, N_t$, and $l=1, \ldots, L$:

$$s_{b,n_t}(\tau_u,f_{d_v})|_l = s_{b-1,n_t}(\tau_u,f_{d_v})|_l - G_{1,b-1,n_t}(\tau_u,f_{d_v})|_l + G_{N_b,b,n_t}(\tau_u,f_{d_v})|_l$$

For $n_t=2, \ldots, N_t$ and $l=1, \ldots, L$ then:

$$s_{1,n_t}(\tau_u,f_{d_v})|_l = s_{N_b,n_t-1}(\tau_u,f_{d_v})|_l - G_{1,N_b,n_t-1}(\tau_u,f_{d_v})|_l + G_{N_b,1,n_t}(\tau_u,f_{d_v})|_l$$

and for $l=2, \ldots, L$ then:

$$s_{1,1}(\tau_u,f_{d_v})|_l = s_{N_b,N_t}(\tau_u,f_{d_v})|_{l-1} - G_{1,N_b,N_t}(\tau_u,f_{d_v})|_{l-1} + G_{N_b,1,1}(\tau_u,f_{d_v})|_l$$

These calculations generate $N_{tk}$ matrices of size $N_T \times N_{fd}$ for each of the $N_b$ possible bit edge positions. Each of these matrices is multiplied by the $2^{N_{tk}-1}$ possible data combinations and the results are added to form a coherent integration. The coherent integration is added incoherently to the previous accumulation to produce $N_b$ groups with each group containing $2^{N_{tk}-1}$ matrices. From each group, only one matrix is added to the new total incoherent integration and the other matrices are discarded (box 310, 314, FIG. 3). The chosen matrix corresponds to the most likely data combination in the last $T_{lk}$. A circular correlation (FFT/IFFT) is performed to obtain the coherent integration as this technique is computational efficient to implement the calculations set forth in this paragraph.

To select the matrix corresponding to the most likely data combination, different approaches are used in the process to increase the sensitivity of the receiver and reduce the degradation in the probability of detection due to a wrong combination. A general approach is defined as follows. Let $I_{coh_{b,E}}$ and $Q_{coh_{b,E}}$ define the real and imaginary parts, respectively, of coherent integration for a bit edge b and a data combination E that was calculated as described above. If $P_{b,l,E}$ defines the total incoherent integration at a step I for a possible bit edge b and a data combination E, it can be defined as:

$$P_{b,l,E}(\tau_u, f_{d_v}) = P_{b,l-1}(\tau_u, f_{d_v}) + [I_{coh_{b,E}}(\tau_u, f_{d_v})^2 + Q_{coh_{b,E}}(\tau_u, f_{d_v})^2]_l$$

Each $P_{b,l,E}$ is a matrix of size $N_T X N_{fd}$. Only one of the $2^{N_{tk}-1}$ matrices for the $P_{b,l,E}$ is used to form the new $P_{b,l}$, which forms the new total integration for the step 1. The selected matrix is the one that contains the maximum power in one of its cells out of all cells in all of the matrices.

The problem with this general approach is that the maximum may be a noise cell so the data cell should be chosen randomly. Therefore, one of the following alternatives is chosen in the beginning of the acquisition process. One alternative is to select PIT to be one data bit length long at the start of the acquisition process. This results in the power accumulation in the correct cell and reduces the probability of choosing a wrong data bit combination.

Another alternative is to keep track of all matrices generated for each group $N_b$ for a predetermined number of $D_i$ steps. At each step, the new coherent matrices are added incoherently to the previous ones. Thus, at the end of the $D_i$ steps, $2^{D_i(N_{tk}-1)}$ matrices are generated and stored for each of the $N_b$ edges, assuming that $T_{Ik}$ does not change during the $D_i$ steps. The matrix having the maximum power in one of its cells after $D_i$ steps is used to form the new incoherent integration for each $N_b$ and the other matrices are discarded. In this alternative, $P_{b,l}$ is calculated every $D_i$ steps and the selected matrix is the one having the maximum power in one of its cells. One limitation of this alternative is the need for computational storage space.

In another alternative, the $2^{N_{tk}-1}$ matrices are generated for each $N_b$ and then the cells having the same index in each matrix are compared and a matrix comprised of the maximum cell at each index is formed. This matrix is added to the total incoherent integration to form the new total incoherent integration. This alternative results in some gain loss, but it does not cause degradation in the probability of detection because there is no loss from a wrong data combination being used. The noise power, however, may increase. This increase is offset by the higher gain compared to when $N_{tk}=1$ is used for the same total integration time.

Another alternative is to chose a different likely data combination for each code delay for all the Doppler shifts. This data combination is chose as the one that generates the maximum power among all the Doppler shifts in the $2^{N_{tk}-1}$ matrices at that code delay.

Preferably, one or more of the alternative approaches are followed for a number of steps equal to $N_{max}$ before switching to the general one described above. If the last two discussed are used, then the process performs the cell wise comparison technique for $N_{maxAll}$ steps and then switches to the different likely combination selection alternative for $N_{maxDelay}$ steps, so that $N_{max}=N_{maxAll}+N_{maxDelay}$. At the end of all steps for the acquisition process, the code delay and the Doppler shift estimates are the ones that correspond to the cell that has the maximum power among all the cells in the $N_b$ matrices, provided this maximum exceeds an acquisition threshold y.

To avoid an increase in the number of Doppler bins as the PIT is increased, the process includes the elimination of Doppler bins. The elimination occurs at a predetermined number of process steps so when the predetermined number of steps have been performed (box 318), the processing circuit 24 eliminates Doppler bins. After the predetermined number of acquisition steps has occurred between Doppler elimination events, a percentage of the Doppler bins are eliminated (box 320). These are the Doppler bins that are unlikely to result in acquiring the signal. Because the correct cell contains information because of the correlation between the received signal and the local signal, it has a high value even though it may not be the maximum power value after the predetermined number of steps. Thus, some percentage of the Doppler bins may be eliminated without preventing the acquisition of the weak signal.

The Doppler bin elimination is performed by identifying the cell having the maximum power at each Doppler bin. This identification is performed for all of the $N_b$ incoherent integration results. The $N_b N_{fd}$ cells are ordered according to their power values from the maximum to the minimum. The Doppler bins corresponding to the higher power values are preserved. The number of bins preserved corresponds to a predetermined percentage of all Doppler bins before elimination begins for a step. The predetermined percentage may change by a maximum or minimum value depending upon wither Doppler bins are added or eliminated. Also, the number of Doppler bins is not permitted to go below a predetermined minimum. If the cutoff power value is repeated for a number of Doppler bins, all of the Doppler bins having the cutoff power value are retained. Numerical values for the percentage cutoffs, the amount of change in the number of bins, and the minimum number of Doppler bins to be retained for a step as well as the number of steps between Doppler bin eliminations are determined from simulations.

The elimination of Doppler bins enables the acquisition process to begin with a small PIT and then increase the PIT as Doppler bins are eliminated without a corresponding increase in the computational resources required for acquisition processing. The process determines whether the PIT can be increased (block 328). The condition for enabling the increase of the PIT is $(\mu/(T_{l_k}-T_{l_{k-1}}))N_{bin_z} \leq N_{bin_{max}}$, where $N_{bin_{max}}$ is the maximum number of Doppler bins, $T_{l_k}$ and $T_{l_{k-1}}$ are the $k^{th}$ and $(k-1)^{th}$ PIT lengths and $\mu$ is a fraction used to determine the minimum separation between any two consecutive Doppler bins where $0<\mu\leq 1$. For example, at the $k^{th}$ PIT, the minimum separation is $\mu/T_{l_k}$.

After the PIT is increased, the remaining Doppler bins are not a range of frequencies with constant separation as a result of the elimination of Doppler bins. Consequently new Doppler bins are defined to account for the narrower bandwidth resulting from the increase in the PIT. The new Doppler bin frequencies are calculated as follows: $N_{DopRng}$ number of ranges are formed from the remaining Doppler bins with frequency separation of $\mu/T_{l_{k-1}}$.KHz. The separation between any two adjacent ranges are larger than this, however, as a result of the prior eliminations. To correct for this result, $D_{k-1,i,nr}$ and $D_{k,j,nr}$ are defined as the frequencies of, respectively, the $i^{th}$ Doppler bin in the $nr^{th}$ range of $T_{l_{k-1}}$ .and the $j^{th}$ Doppler bin in the $nr^{th}$ range of $T_{l_k}$.nr=1, . . . , $N_{DopRng}$. The true Doppler shift could lie at a separation in frequency as large as $(0.5\mu/T_{l_{k-1}})$ from one of the ranges. For each of the $N_{DopRng}$ ranges, the frequencies of the new Doppler bins are found by calculating the first and the last Doppler bin frequencies as $D_{k,1,nr}=D_{k-1,1,nr}-(½)(\mu/T_{l_{k-1}})$, $D_{k,last,nr}=D_{k-1,N_{k-1,nr},nr}+(½)(\mu/T_{l_{k-1}})$, where $N_{k-1,nr}$ is the total number of the Doppler bins in the $nr^{th}$ range of $T_{l_{k-1}}$. The total number of Doppler bins $N_{k,nr}$ in the $nr^{th}$ range of $T_{l_k}$ can be calculated from $N_{k,nr}$ = the least integer larger than $(T_{l_k}/\mu)|D_{k,last,nr}-D_{k,1,nr}|+1$. The frequencies of the remaining bins are found from $D_{k,l,nr}=D_{k,i-1,nr}+\mu/T_{l_k}$, for i=2, ..., last. Since some of the new Doppler bins at the $k^{th}$ PIT do not have an accumulation result up to the current step, their accumulations are set to the accumulation of the nearest old bins.

Once the process detects that all of the acquisition steps have been performed (box 332), the incoherent integration total is compared to a threshold γ (box 336). If it is greater than the threshold, the code delay is identified (box 338) and the estimated Doppler shift and the change in the code delay ΔT relative to the start of the acquisition interval may be determined in a known manner from the estimated Doppler shift. The threshold is determined by a search process. Every value for γ and the total number of integrations, L, yield a certain probability of false alarm ($p_f$) and probability of detection ($p_d$). The probability of false alarm refers to the probability that a power value higher than the threshold is generated if there is no signal present. The probability of detection refers to a power value that exceeds the threshold at the correct cell where the signal is present. A simulation is used to search for the $p_f$ that is ≦ the desired probability of false alarm and for a $p_d$ that is ≧ the desired probability of detection.

An exemplary table of settings for a processing circuit 24 implementing the process described above is shown in Table 1.

TABLE 1

| Parameter | 17 dB-Hz | 15 dB-Hz | 10 dB-Hz |
|---|---|---|---|
| Initial PIT (ms) | 20 | 20 | 20 |
| Final PIT (ms) | 120 | 120 | 120 |
| Number of steps for each PIT | [10 10 5 2 2 1] | [30 30 4 4 4 7] | [60 45 20 20 10 16] |
| Total number of steps | 30 | 79 | 171 |
| First number of acquisition steps between Doppler bin elimination steps ($N_{ez}$) | 5 | 15 | 15 |
| Change $N_{ez}$ after | 25 steps | 60 steps | 105 steps |
| Percentage of Doppler bin elimination | [.3 .35 .4 .5 .7 .8] | [.2 .25 .6 .7 .7 .8] | [.35 .2 .25 .4 .45 .6] |
| Amount of change in Doppler bin elimination percentage | [−.05 −.05 0 0 0] | [−.05 0.05 0 0 0] | [−.25 0.05 0 0 0] |
| Maximum change in Doppler bin elimination | [.2 .3 .4 .5 .7 .8] | [.15 .3 .6 .7 .7 .8] | .05 .25 .25 .4 .45 .6] |
| Minimum number of Doppler bins for a step level | [80 40 40 10 5 5] | [80 40 40 10 5 5] | [100 80 80 60 20 5] |
| Maximum number of step before switching to general approach for eliminating Doppler bins | 29 | 70 | 160 |
| Number of steps for cell wise comparison in Doppler bin elimination | 15 | 40 | 160 |
| Number of steps for different likely data combination approach for Doppler bin elimination | 14 | 30 | 0 |

Figure 4:
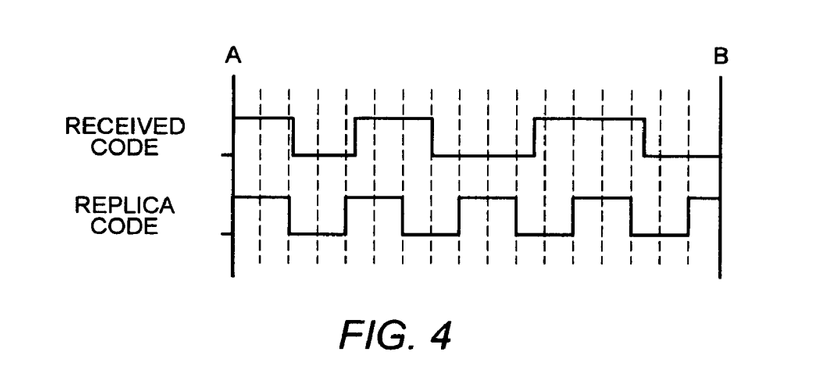
FIG. 4 illustrates the problems with using an uncompensated replica code for coherent integration calculations.

Another embodiment of the present invention uses a double block zero padding scheme to compute the coherent integrations in the process shown in FIG. 3. As shown in FIG. 4, a replica code that is not compensated for the Doppler effect on the code duration does not align well with the received signal. In the figure, the upper code is the received code and a negative Doppler shift causes the code length to increase. The lower code is the uncompensated replica code and the dotted lines indicate sampling periods over the coherent integration interval that spans from A to B. This figure illustrates that a fraction of the code chip between subsequent samples is not the same in the received code as it is in the replica code. Thus, by the end of the integration interval, the received code has produced fewer chips than the replica code. This causes the relative delay between the two codes to change and a subsequent incoherent integration is added at the wrong delay.

In a system using the modified DBZP scheme the received IF signal is converted to baseband. The selection of the PIT also includes arranging the $T_I$-long baseband samples into blocks (block 500, FIG. 5). The number of blocks is equal to the number of Doppler bins $N_{fd}$. The Doppler bin separation is $1/T_I$. The block size includes $S_{block}$ samples. Every block of received samples is then augmented with the subsequent block. Thus, the number of blocks remains the same, but each block is now twice as long. $T_I$-long samples of the replica code are arranged into the same number of blocks and each block of the replica code is padded with $S_{block}$ zeros to produce $N_{fd}$ block of length $2S_{block}$ (block 504). This is done for each of the $N_{range}$ frequencies with a length of TI ms.

Figure 5:
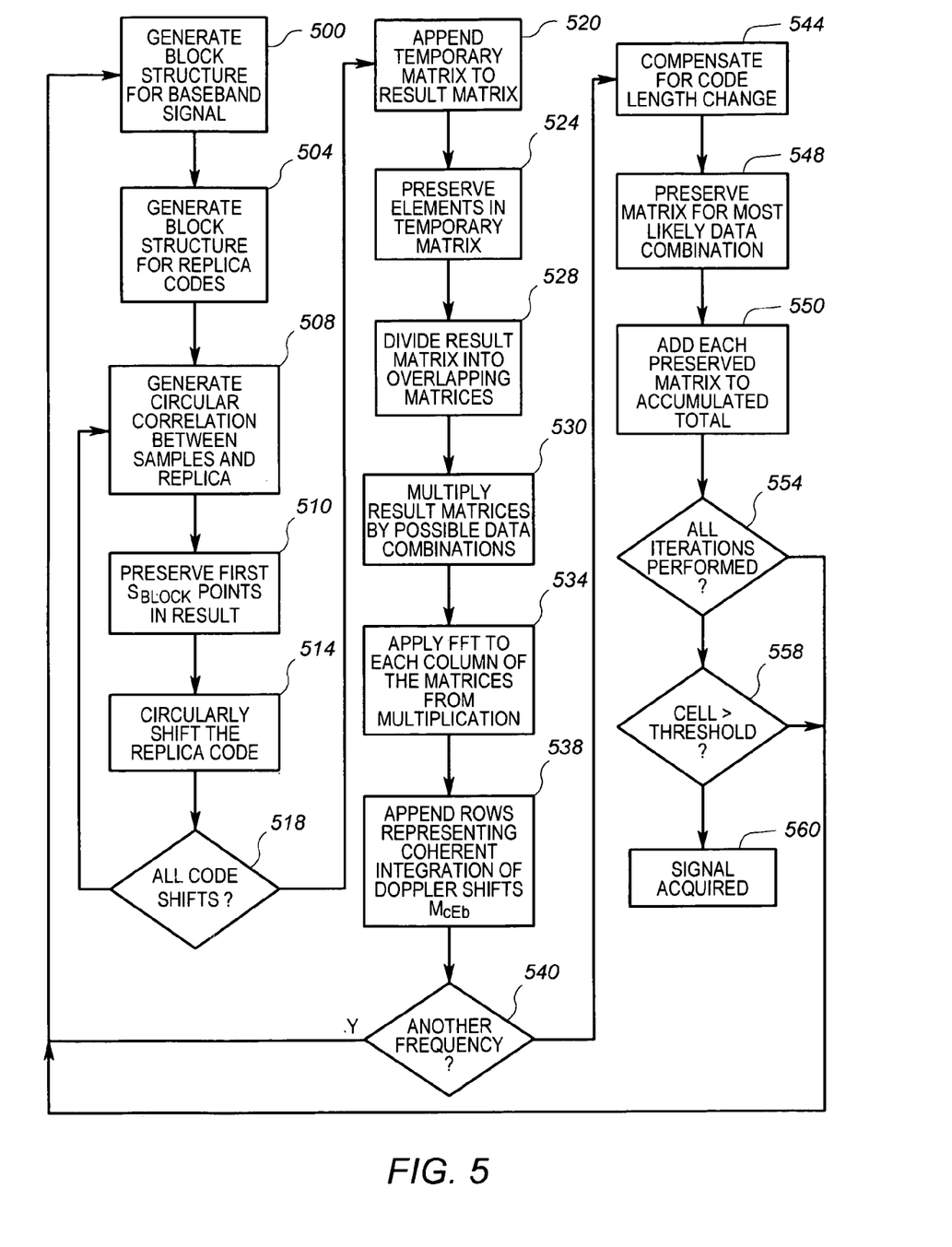
FIG. 5 shows a flow diagram for an exemplary set of operations for the implementing modified double block zero padding processing of a received signal with local replica codes with the processing circuit shown in FIG. 1.

For each $N_{range}$ frequency, a circular correlation is calculated between each two corresponding blocks of the received baseband signal and the locally generated C/A code samples (block 508). The circular correlation between each two blocks produces a block of size $2S_{block}$ points. The first $S_{block}$ points of each resultant block are preserved, while the rest are discarded (block 510). The preserved points from all the blocks are arranged in a form of a matrix of size $N_{fd}XS_{block}$. The $jj^{th}$ column contains the results at index jj from each resultant block. The $ii^{th}$ row contains the results of the $ii^{th}$ block. For the $i^{th}$ Doppler range, these results are appended to a matrix $M_{ci}$ at the row indices from $[(N_b-1)N_{bEdge}+1]$ to $[(N_b-1)N_{bEdge}+N_{fd}]$ and at column indices from $[(m_r-1)S_{block}+1]$ to $[m_rS_{block}+1]$.

For each step, the blocks of the replica C/A code are circularly shifted by one block so that the first block is move back to become the last one, while the rest of the blocks are shifted one block position to the front (block 514). After all the replica codes have been shifted and correlated to the sample (block 518), the matrix $M_{ci}$ has $N_{step} \cdot S_{block} = N_T$ columns. A temporary matrix $M_{cTemp}$ is appended to $M_{Ci}$ at the row indices from 1 to $(N_b-1)N_{bEdge}$ and at the column indices from 1 to $N_T$ (block 520). The elements of $M_{ci}$ at row indices from $[N_{fd}+1]$ to $[N_{fd}+(N_b-1)N_{bEdge}]$ and column indices from 1 to $N_T$ are preserved in the matrix $M_{cTemp}$, for use in the next acquisition step (block 524). The matrix $M_{ci}$ is divided into $N_b$ overlapping matrices. Each matrix $M_{cbi}$ is of size equal to $N_{fd}XN_T$ and represents the result of the $b^{th}$ possible bit edge position (block 528).

Because each of the matrices $M_{cbi}$, where b=1, ..., $N_b$ is generated from a data of size equal to the coherent integration time $T_I$, where $T_I=N_tT_{dms}$, then each $N_{fd}/N_t$ rows of the $M_{cbi}$ matrix may be viewed as being generated using one of the $N_t$ bits. Thus, before performing the last integration necessary to form the coherent integration for a total integration time of $T_I$, each $M_{cbi}$ matrix is multiplied by one of the $2^{N_t-1}$ possible data bit combinations. This multiplication generates $2^{N_t-1}$ matrices for each of the $N_b$ possible bit edges. These matrices may be denoted as $M_{cEbi}$, where $E=1, \ldots, 2^{N_t-1}$.

The coherent integration is found by applying an FFT to each column of these $N_b 2^{N_t-1}$ matrices (block 534). Each cell(ii,jj) corresponds to the correlation at the Doppler bin ii and the code delay jj. The rows at the offset $O_{fsi}$ to $O_{fei}$ of the $M_{cEbi}$ matrix represent the coherent integration of the Doppler shifts of the $i^{th}$ Doppler range. Only these rows are appended to a matrix $M_{cEb}$ at offset $O_{fsi}$ to $O_{fei}$. The other rows of the $M_{cEbi}$ matrix are discarded (block 538).

The process continues for other frequency samples (block 540). At the end of this processing, $N_b 2^{N_t-1}$ matrices have been generated, each of which is of size $N_{fd} X N_T$ and represents a $T_l$, coherent integration. The process continues by compensating for the code length change resulting from the difference in the Doppler frequencies between the middle $f_{mid}$, of each $N_{range}$ and the other Doppler frequencies of each $N_{range}$ (block 544). Because each row of $M_{cEb}$ corresponds to a possible Doppler frequency, the compensation may be performed by circularly shifting each row by the number of samples $N_{sv}=\text{sign}(f_{dv}-f_{mid})$ round $[(l-1)T_l f_s (|f_{dv}-f_{mid}|/f_{L1})]$, where $f_{L1}$, is the carrier frequency. The number of samples depends upon the difference between $f_{midi}$ and the frequency of the Doppler bin $f_{dv}$. The shifted rows form the coherent integration for the $l_{th}$ step.

For each possible bit edge position, one matrix of the $2^{N_t-1}$ matrices is preserved and the rest are discarded (block 548). This matrix corresponds to the most likely data combination. To select the matrix corresponding to the most likely data combination, different approaches are used in the process to increase the sensitivity of the receiver and reduce the degradation in the probability of detection due to a wrong combination. A general approach is defined as follows. Let $I_{coh_{b,E}}$ and $Q_{coh_{b,E}}$ define the real and imaginary parts, respectively, of coherent integration for a bit edge b and a data combination E. If $P_{b,l,E}$ defines the total incoherent integration at a step l for a possible bit edge b and a data combination E, it can be defined as:

$$P_{b,l,E}(\tau_u,f_{d_v}) = P_{b,l-1}(\tau_u,f_{d_v}) + [I_{coh_{b,E}}(\tau_u,f_{d_v})^2 + Q_{coh_{b,E}}(\tau_u,f_{d_v})^2]_l$$

In this equation, T is a possible code delay, $u=1, \ldots, N_T$; and $f_{dv}$ is a possible Doppler shift, $v=1, \ldots, N_{fd}$. Each $P_{b,l,E}$ is a matrix of size $N_T X N_{fd}$. Only one of the $2^{N_{tk}-1}$ matrices for the $P_{b,l,E}$ is used to form the new $P_{b,l}$, which forms the new total integration for the step l. The selected matrix is the one that contains the maximum power in one of its cells out of all cells in all of the matrices.

The problem with this general approach is that the maximum may be a noise cell so the data cell should be chosen randomly. Therefore, the following alternatives are done in the beginning of the acquisition process. In the first alternative, the $2^{N_{tk}-1}$ matrices are generated for each Nb and then the cells having the same index in each matrix are compared and a matrix comprised of the maximum cell at each index is formed. Thus, the likely data bit combination is estimated separately for each cell so that at a delay τu and Doppler fdv, the new result is: $P_{b,l}(\tau_u,f_{d_v}) = \max \{P_{b,l1}(\tau_u,f_{d_v}), P_{b,l2}(\tau_u,f_{d_v}), \ldots, P_{b,l2^{Nlk-1}}(\tau_u,f_{d_v})\}$ This selection method is used for $N_{maxAll}$ steps. Following that, a second alternative is used where a different likely data combination is chosen for each code delay for all the Doppler shifts. This data combination is chosen as the one that generates the maximum power among all the Doppler shifts in the $2^{N_{tk}-1}$ matrices at that code delay. This method is used for $N_{maxDelay}$ steps, so that $N_{max} = N_{maxAll} + N_{maxDelay}$. At the end of the $N_{max}$ steps, the process performs the general approach discussed above.

The process in FIG. 5 continues by adding incoherently each of the $N_b$ preserved matrices to the corresponding previous total accumulation (block 550). At the end of each step in the acquisition, there are $N_b$ accumulations. After the acquisition steps are performed (block 554), any cell in the matrix having a value that exceeds the threshold γ (block 558) indicates that a satellite has been detected (block 560). The cell containing the maximum power corresponds to the estimated code delay and Doppler shift. The matrix containing this maximum also corresponds to the estimated bit edge position.

Figure 6:
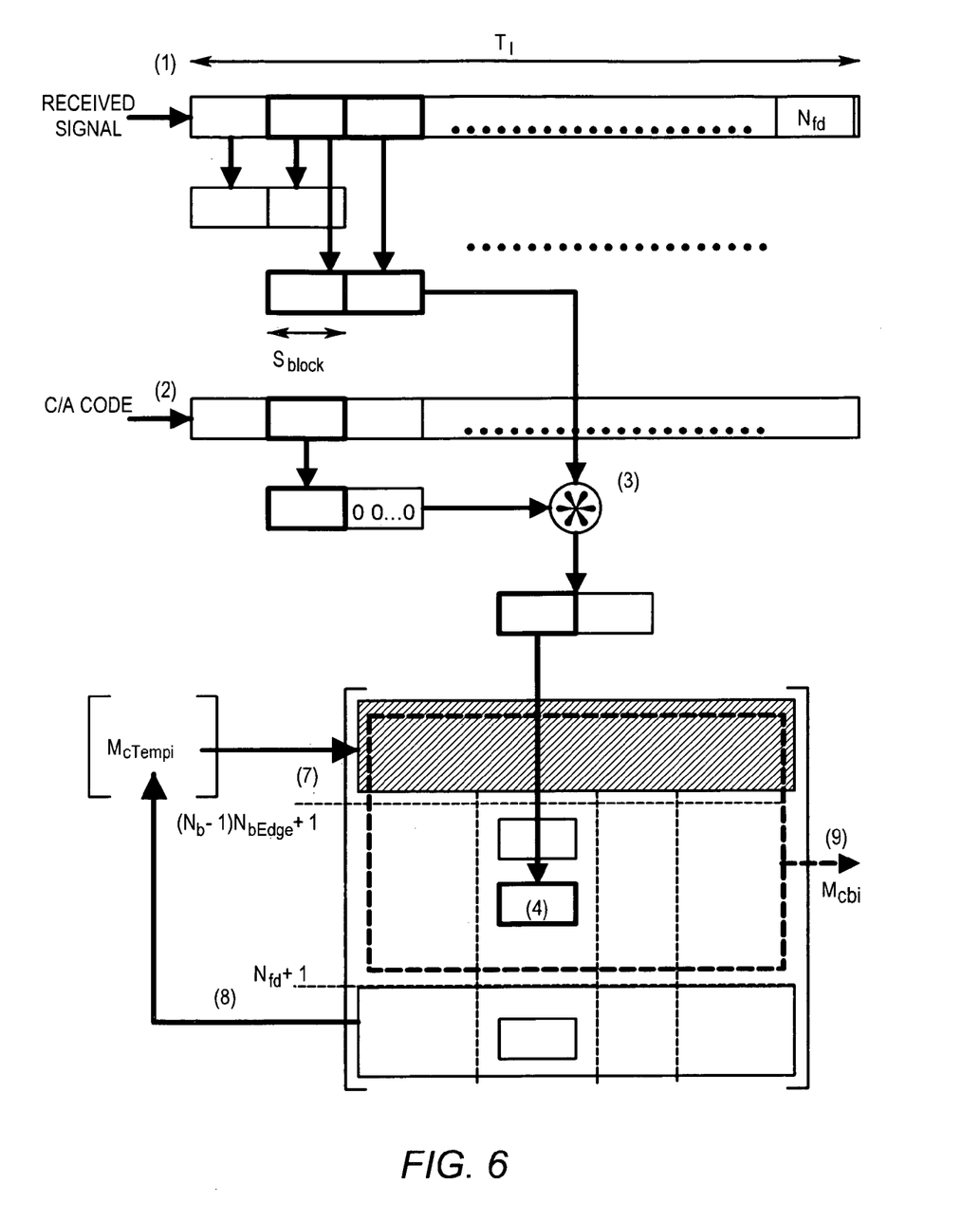
FIG. 6 is a depiction of the modified double block zero padding processing.
Figure 7:
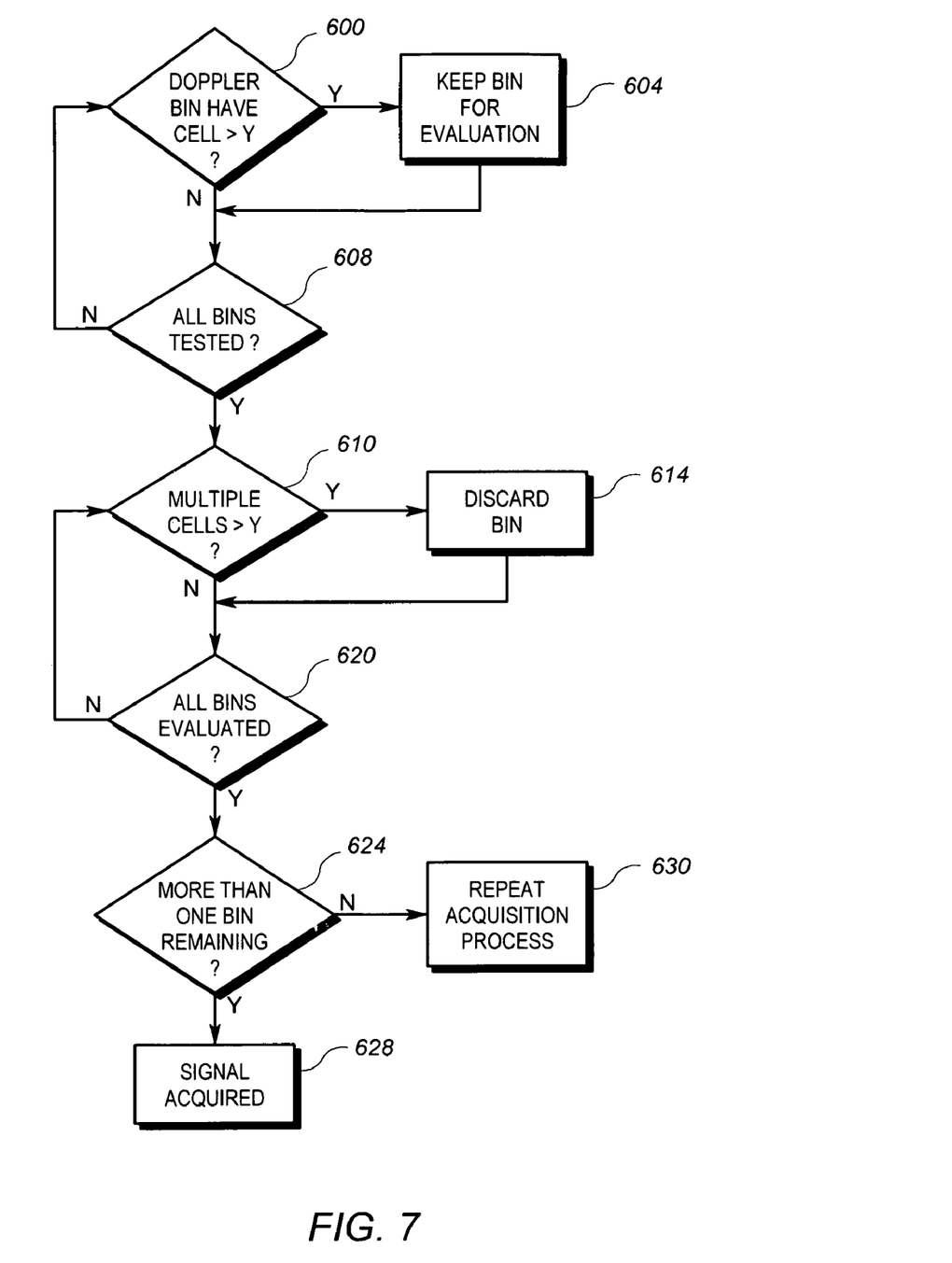
FIG. 7 shows a flow diagram for an exemplary set of operations for acquiring a weak signal in the presence of strongly interfering signals that may be used with the system shown in FIG. 1.

FIG. 6 depicts on overview of the acquisition process using the modified double block zero processing. The received signal is segmented into blocks as described above and the replica code is also segmented. The replica codes are taken one block at time with the trailing zero padding. The received signal is processed two blocks at a time. The operation between the two signals generates a result of which only the lead portion is preserved. This portion is incorporated in the matrices used for the acquisition integrations in the process described above.

A method shown in FIG. 6 may be used to acquire a GPS signal in the presence of strongly interfering signals. The method is similar to those described above except the total number of integrations L and the acquisition threshold γ are designed with reference to noise and the interfering signal. The probability of a false alarm in this scenario pf is calculated as $pf = \max\{p_{fn}, p_{DC}\}$, where $p_{fn}$ is the probability of false alarm if there is no interfering signal and $p_{DC}$ is the probability of detection of the interfering signal. The threshold y is calculated from $y = \max\{y(p_{fn}), y(p_{DC})\}$, where $y(p_{fn})$ is the threshold calculated based on the noise power and $p_{fn}$ while $y(p_{DC})$ is the maximum expected power level of the interfering signal.

To be able to use a PIT multiple $N_t$ of $T_{dms}$, the most likely data combination is estimated in each cell independently of the other cells through the acquisition process so $N_{max} = L$. Also, an alternative method is to choose one most likely data combination for each Doppler bin at all of its code delays. This is the combination that generates the maximum power for that Doppler bin. Both $p_f$ and γ are calculated with reference to the correct PDF resulting from such an approach. The PDF and $p_f$ are calculated numerically because it is not possible to calculate them in a closed form.

A bound on the calculation of $p_f$ may be expressed as $$p_f \leq \sum_{j=1}^{N_{cell_m}} [1 - F_{S_{Sj}}(\gamma)] + (N_{cell} - N_{cell_m})[1 - F_{S_L}(\gamma)]$$

where $F_{s_{Sj}}(\gamma)$ is obtained by integrating the following equation from 0 to γ and from γ to ∞: $f_{s_j}(s) = f_{N_{max}} * f_{q_{1j}N_{rest1}} * \ldots * f_{qN_{Tj}N_{restNTj}} * f_{(1-q_j)N_{rest}}$, where $fq_{kj}N_{rest_k}$ is a PDF obtained by convolving $fq_{kj}N_{rest_k}$ functions of the $f_{wk}(w)$. While $f_{(1-q_j)N_{rest}}$ is a PDF with a form:

$$f_s(s) = \frac{1}{2^L k} \frac{s^{L-1}}{(L-1)!} e^{-\frac{s}{2}}$$

except $(1-q_j)N_{rest}$ replaces L.

A method for acquiring a weak signal in the presence of strongly interfering signals is shown in FIG. 6. The method works if the Doppler shift of the strong signal does not affect the Doppler shift of the correct signal. That is, the Doppler shift of the interfering signal does not appear on the same bin as the Doppler shift of the correct signal. In this method, the threshold γ is computed with reference to noise only. Also, the most likely data bit combination is estimated in each cell independently of other cells through the acquisition process so $N_{max}$=L. The method begins by testing whether a Doppler bin has a cell that exceeds a threshold y that has been computed with reference to noise only (block 600). Those bins have a cell that exceeds the threshold are kept for later evaluation (block 604) and the testing continues until all bins have been tested (block 608). The process determines if more than one code delay exceeds the threshold for a Doppler bin (block 610). If it does, the bin is discarded (block 614). This evaluation continues until all Doppler bins have been evaluated (block 620). If only one Doppler bin has a code delay greater than the threshold (block 624), the signal has been acquired (block 628). Otherwise, the acquisition process continues (block 630).

The above described embodiment and variants thereof are merely exemplary and those of ordinary skill in the art may readily devise their own implementations that incorporate the principles of the present invention and fall within the scope and spirit thereof.

We claim:

1. A method of acquiring a weak signal in a GPS receiver comprising:
   selecting a first predetection integration time (PIT) interval for processing a digital intermediate frequency (IF) signal,
   selecting a number of data bit edges within the PIT,
   computing a plurality of coherent integrations for each data bit edge,
   selecting a coherent integration, which corresponds to a most likely data combination for each data bit edge, from the plurality of coherent integrations,
   updating an incoherent integration total for each data bit edge with the coherent integration corresponding to the selected most likely data bit combination for each data bit edge,
   comparing the incoherent integration total for each data bit edge with a threshold after a predetermined number of steps of the coherent integration computations and incoherent integration total updates, and
   identifying a code delay from the incoherent integration.

2. The method of claim 1 further comprising:
   determining a code delay from an estimated Doppler shift corresponding to the identified code delay.

3. The method of claim 1, the coherent integration computations being computed using a circular correlation technique.

4. The method of claim 3, the circular correlation being performed over intervals corresponding to the separation between data bit edges; and
   forming longer integrations through summing the circular correlation results in different combinations.

5. The method of claim 1 further comprising:
   eliminating Doppler bins after a predetermined number of steps of incoherent integration total updates.

6. The method of claim 5 further comprising:
   preserving from elimination Doppler bins that correspond to Doppler shifts for each data edge having a maximum power cell.

7. The method of claim 1, the PIT selection selecting a PIT that is one bit length of a data signal imposed on the digital IF signal.

8. The method of claim 5 further comprising:
   increasing the PIT in response to the number of Doppler bins being less a predetermined maximum.

9. The method of claim 8 wherein the PIT is increased by an integral number of data bit lengths.

10. The method of claim 9 wherein the number of data bit lengths for the PIT is selected to be equal to or greater than 4 and less than 20.

11. The method of claim 1, the coherent integration computation further comprising:
    implementing a compensated double block zero padding (DBZP) scheme for computing the coherent integrations.

12. The method of claim 11 further comprising:
    performing circular correlation to generate correlation points for pairs of corresponding blocks in a received sample and a replica code; and
    preserving only the correlation points for a first block in a pair of blocks used for a circular correlation.

13. The method of claim 12 further comprising:
    using possible Doppler shifts in a middle of a Doppler range to generate replica codes for Doppler effect compensation.

14. The method of claim 13 further comprising:
    estimating a change in a relative code delay to shift a coherent integration result; and incorporating the shifted coherent integration result into a total accumulation.

15. The method of claim 1 wherein the threshold is computed with reference to noise and an interfering signal.

16. The method of claim 1 wherein the threshold is computed with reference to noise only.

* * * * *